US012811701B2

(12) United States Patent
Mu

(10) Patent No.: US 12,811,701 B2
(45) Date of Patent: Nov. 24, 2026

(54) CHANNEL STATE INFORMATION MEASUREMENT METHODS AND APPARATUSES AND STORAGE MEDIA

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 284 days.

(21) Appl. No.: 18/559,168

(22) PCT Filed: May 7, 2021

(86) PCT No.: PCT/CN2021/092220
§ 371 (c)(1),
(2) Date: Nov. 6, 2023

(87) PCT Pub. No.: WO2022/233057
PCT Pub. Date: Nov. 10, 2022

(65) Prior Publication Data
US 2024/0243826 A1 Jul. 18, 2024

(51) Int. Cl.
*H04B 17/382* (2015.01)

(52) U.S. Cl.
CPC .................................. *H04B 17/382* (2015.01)

(58) Field of Classification Search
CPC .... H04B 17/382; H04B 17/309; H04L 5/0064
See application file for complete search history.

(56) References Cited

U.S. PATENT DOCUMENTS

2016/0127936 A1 5/2016 Chatterjee et al.
2016/0134408 A1* 5/2016 Kim ...................... H04L 5/0048 370/329
2018/0219664 A1* 8/2018 Guo ...................... H04W 24/10
(Continued)

FOREIGN PATENT DOCUMENTS

CN 103339982 A 10/2013
CN 103918208 A 7/2014
(Continued)

OTHER PUBLICATIONS

ISA State Intellectual Property Office of the People's Republic of China, International Search Report Issued in Application No. PCT/CN2021/092220, Dec. 24, 2021, WIPO, 2 pages.
(Continued)

*Primary Examiner* — Tejis Daya
(74) *Attorney, Agent, or Firm* — Volpe Koenig

(57) ABSTRACT

The present disclosure provides channel state information measurement methods and apparatuses and storage media. The channel state information measurement method includes: determining multiple measurement resource subsets for performing channel state information reference signal measurement and measurement time units respectively corresponding to the multiple measurement resource subsets, where different measurement resource subsets correspond to different measurement time units, measuring, within the measurement time units corresponding to the multiple measurement resource subsets, a channel state information reference signal.

20 Claims, 8 Drawing Sheets

(56) References Cited

U.S. PATENT DOCUMENTS

| | | | | |
|---|---|---|---|---|
| 2018/0278437 | A1* | 9/2018 | Davydov ............ | H04B 7/0617 |
| 2020/0052942 | A1* | 2/2020 | Lin .................. | H04W 36/0088 |
| 2021/0076243 | A1 | 3/2021 | Manolakos | |
| 2021/0195608 | A1 | 6/2021 | Wu et al. | |
| 2025/0039724 | A1* | 1/2025 | Venugopal ......... | H04B 7/06952 |
| 2025/0310926 | A1* | 10/2025 | Khalajmehrabadi . | H04W 64/00 |

FOREIGN PATENT DOCUMENTS

| | | | |
|---|---|---|---|
| CN | 107005297 | A | 8/2017 |
| CN | 107113647 | A | 8/2017 |
| CN | 109196905 | A | 1/2019 |
| CN | 110139375 | A | 8/2019 |
| CN | 110891301 | A | 3/2020 |
| CN | 111885683 | A | 11/2020 |

OTHER PUBLICATIONS

3GPP. “Physical Layer Procedures for Data(Release 16)” sections 5.2.1.4-5.2.4,3GPP TS 38.214 VI6.5.0, Mar. 30, 2021,53 pages.

NTT DOCOMO,Inc., “Views on CSI measurement for NR”,3GPP TSG RAN WG1 Meeting 91, Dec. 1, 2017,12 pages.

Chinese Office Action issued on Jul. 25, 2026 for Chinese Patent Application No. 202311054592.0.

* cited by examiner

```
CSI-FrequencyOccupation ::=          SEQUENCE {
    startingRB               INTEGER (0..maxNrofPhysicalResourceBlocks-1),
    nrofRBs                  INTEGER (24..maxNrofPhysicalResourceBlocksPlus1),
    ...
}
```

| $\mu$ | $N_{symb}^{slot}$ | $N_{slot}^{frame,\mu}$ | $N_{slot}^{subframe,\mu}$ | |
|---|---|---|---|---|
| 0 | 14 | 10 | 1 | ← 15kHz |
| 1 | 14 | 20 | 2 | ← 30kHz |
| 2 | 14 | 40 | 4 | ← 60kHz |
| 3 | 14 | 80 | 8 | ← 120kHz |
| 4 | 14 | 160 | 16 | ← 240kHz |

< 38.211-Table 7.4.1.5.3-1: CSI-RS locations within a slot. >

| Row | Ports $X$ | Density $\rho$ | cdm-Type | $(\bar{k},\bar{l})$ | CDM group index $j$ | $k'$ | $l'$ |
|---|---|---|---|---|---|---|---|
| 1 | 1 | 3 | No CDM | $(k_0,l_0),(k_0+4,l_0),(k_0+8,l_0)$ | 0,0,0 | 0 | 0 |
| 2 | 1 | 1, 0.5 | No CDM | $(k_0,l_0)$, | 0 | 0 | 0 |
| 3 | 2 | 1, 0.5 | FD-CDM2 | $(k_0,l_0)$, | 0 | 0, 1 | 0 |
| 4 | 4 | 1 | FD-CDM2 | $(k_0,l_0),(k_0+2,l_0)$ | 0,1 | 0, 1 | 0 |
| 5 | 4 | 1 | FD-CDM2 | $(k_0,l_0),(k_0,l_0+1)$ | 0,1 | 0, 1 | 0 |
| 6 | 8 | 1 | FD-CDM2 | $(k_0,l_0),(k_1,l_0),(k_2,l_0),(k_3,l_0)$ | 0,1,2,3 | 0, 1 | 0 |
| 7 | 8 | 1 | FD-CDM2 | $(k_0,l_0),(k_1,l_0),(k_0,l_0+1),(k_1,l_0+1)$ | 0,1,2,3 | 0, 1 | 0 |
| 8 | 8 | 1 | CDM4 (FD2,TD2) | $(k_0,l_0),(k_1,l_0)$ | 0,1 | 0, 1 | 0, 1 |
| 9 | 12 | 1 | FD-CDM2 | $(k_0,l_0),(k_1,l_0),(k_2,l_0),(k_3,l_0),(k_4,l_0),(k_5,l_0)$ | 0,1,2,3,4,5 | 0, 1 | 0 |
| 10 | 12 | 1 | CDM4 (FD2,TD2) | $(k_0,l_0),(k_1,l_0),(k_2,l_0)$ | 0,1,2 | 0, 1 | 0, 1 |
| 11 | 16 | 1, 0.5 | FD-CDM2 | $(k_0,l_0),(k_1,l_0),(k_2,l_0),(k_3,l_0),(k_0,l_0+1),$ $(k_1,l_0+1),(k_2,l_0+1),(k_3,l_0+1)$ | 0,1,2,3, 4,5,6,7 | 0, 1 | 0 |
| 12 | 16 | 1, 0.5 | CDM4 (FD2,TD2) | $(k_0,l_0),(k_1,l_0),(k_2,l_0),(k_3,l_0)$ | 0,1,2,3 | 0, 1 | 0, 1 |
| 13 | 24 | 1, 0.5 | FD-CDM2 | $(k_0,l_0),(k_1,l_0),(k_2,l_0),(k_0,l_0+1),(k_1,l_0+1),$ $(k_2,l_0+1),(k_0,l_1),(k_1,l_1),(k_2,l_1),(k_0,l_1+1),$ $(k_1,l_1+1),(k_2,l_1+1)$ | 0,1,2,3,4,5, 6,7,8,9,10,11 | 0, 1 | 0 |
| 14 | 24 | 1, 0.5 | CDM4 (FD2,TD2) | $(k_0,l_0),(k_1,l_0),(k_2,l_0),(k_0,l_1),(k_1,l_1),(k_2,l_1)$ | 0,1,2,3,4,5 | 0, 1 | 0, 1 |
| 15 | 24 | 1, 0.5 | CDM8 (FD2,TD4) | $(k_0,l_0),(k_1,l_0),(k_2,l_0)$ | 0,1,2 | 0, 1 | 0, 1, 2, 3 |
| 16 | 32 | 1, 0.5 | FD-CDM2 | $(k_0,l_0),(k_1,l_0),(k_2,l_0),(k_3,l_0),(k_0,l_0+1),$ $(k_1,l_0+1),(k_2,l_0+1),(k_3,l_0+1),(k_0,l_1),$ $(k_1,l_1),(k_2,l_1),(k_3,l_1),(k_0,l_1+1),(k_1,l_1+1),$ $(k_2,l_1+1),(k_3,l_1+1)$ | 0,1,2,3, 4,5,6,7, 8,9,10,11, 12,13,14,15 | 0, 1 | 0 |
| 17 | 32 | 1, 0.5 | CDM4 (FD2,TD2) | $(k_0,l_0),(k_1,l_0),(k_2,l_0),(k_3,l_0),(k_0,l_1),(k_1,l_1),$ $(k_2,l_1),(k_3,l_1)$ | 0,1,2,3,4,5,6,7 | 0, 1 | 0, 1 |
| 18 | 32 | 1, 0.5 | CDM8 (FD2,TD4) | $(k_0,l_0),(k_1,l_0),(k_2,l_0),(k_3,l_0)$ | 0,1,2,3 | 0,1 | 0,1, 2, 3 |

FIG. 4

```
nrofPorts                        ENUMERATED {p1,p2,p4,p8,p12,p16,p24,p32},
firstOFDMSymbolInTimeDomain      INTEGER (0..13),
firstOFDMSymbolInTimeDomain2     INTEGER (2..12) OPTIONAL, -- Need R
```

FIG. 5

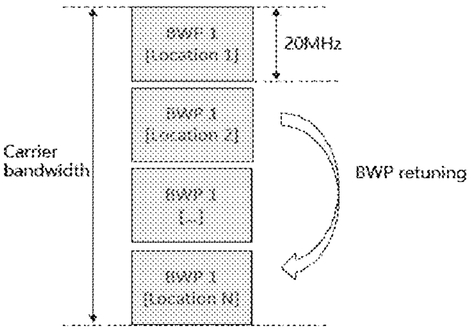

FIG. 6

CHANNEL STATE INFORMATION MEASUREMENT METHODS AND APPARATUSES AND STORAGE MEDIA

CROSS-REFERENCE TO RELATED APPLICATIONS

This application is a National Stage of International Application No. PCT/CN2021/092220, filed on May 7, 2021, the contents of all of which are incorporated herein by reference in their entirety.

TECHNICAL FIELD

The present disclosure relates to the field of communication technologies, and in particular to channel state information measurement methods and apparatuses and storage media.

BACKGROUND

In the Long Term Evolution (LTE) 4G system, in order to support internet-of-things services, two major technologies, i.e., Machine Type Communication (MTC) and Narrow band Internet of thing (NB-IoT), are proposed. The two major technologies are mainly used for scenarios of low rate and high delay and the like, for example, scenarios of meter reading and environmental monitoring and the like. At present, the NB-IoT can support a rate of up to several hundred kilobytes, and the MTC can support a rate of up to several megabytes. Along with the continuous development of the IoT services, for example, along with the popularization of services such as video monitoring, intelligent home, wearable device, and industrial sensor monitoring, and the like, these services usually require a rate from dozens of megabytes to 100 M while having high requirements for delay. In this case, the MTC in the related technologies makes it impossible for the NB-IoT technology to satisfy the requirements. Therefore, it is proposed to redesign a new terminal type in the 5G New Radio (NR) to satisfy the requirements of the middle IoT devices. In the current 3GPP standardization, the new terminal type is called a low-capability terminal and sometimes called Reduced Capability User Equipment (UE), or called Redcap terminal, or simply called NR-lite.

Because the bandwidth of the Redcap terminal is limited, there are two manners for the Redcap terminal to better obtain frequency diversity or frequency selective gain at present: Manner 1: a bandwidth part (BWP) greater than a terminal bandwidth is configured for the terminal.

Manner 2: multiple frequency band parts are configured for the terminal; each frequency band part is within the bandwidth capability range of the terminal, but the terminal can perform data frequency hopping within several frequency bands or select good frequency band parts for data transmission.

However, during configuration of a sub-band or frequency band for the Redcap terminal based on the above manners, when the terminal desires to obtain a frequency selective gain to measure channel state information (CSI), the terminal is incapable of measuring all resources at the same time due to the limited bandwidth of the terminal. At this time, it is required to segment the measurement resources such that measurement can be performed on different measurement resource subsets. By now, there is no good solution on how to perform CSI measurement on different measurement resource subsets.

SUMMARY

In order to overcome the problems in the related arts, the present disclosure provides channel state information measurement methods and apparatuses and storage media.

According to a first aspect of embodiments of the present disclosure, there is provided a channel state information measurement method, which is performed by a terminal. The channel state information measurement method includes:

determining multiple measurement resource subsets for performing channel state information reference signal measurement and measurement time units respectively corresponding to the multiple measurement resource subsets, where different measurement resource subsets correspond to different measurement time units; measuring, within the measurement time units corresponding to the multiple measurement resource subsets, a channel state information reference signal.

In an embodiment, each of the multiple measurement resource subsets is configured with a measurement time unit, and the measurement time units corresponding to the multiple measurement resource subsets are independently configured with each other.

In an embodiment, the multiple measurement resource subsets include first-part measurement resource subsets and second-part measurement resource subsets; the first-part measurement resource subsets correspond to first measurement time units and the second-part measurement resource subsets correspond to second measurement time units; there is an association relationship between the first measurement time units and the second measurement time units.

In an embodiment, each of the measurement time units includes a measurement slot, and the multiple measurement resource subsets are respectively configured with a same measurement period and different slot offsets.

In an embodiment, each of the measurement time units includes a measurement slot, and the first measurement time units and the second measurement time units are different measurement slots determined based on a common measurement period and a common slot offset.

In an embodiment, resource element positions of the channel state information reference signal within a physical resource block in different measurement slots are the same.

In an embodiment, the measurement slots are continuous in time.

In an embodiment, the measurement time units corresponding to the multiple measurement resource subsets are different symbols in a same slot.

In an embodiment, there is a symbol interval between different symbols.

In an embodiment, the measurement time units, respectively corresponding to the multiple measurement resource subsets, are independently-configured symbols.

In an embodiment, the measurement time units, respectively corresponding to the multiple measurement resource subsets, are determined based on a common symbol.

According to a second aspect of the embodiments of the present disclosure, there is provided a channel state information measurement method, which is performed by a network device. The channel state information measurement method includes:

configuring measurement time units respectively corresponding to multiple measurement resource subsets for performing channel state information reference signal measurement, where different measurement resource subsets correspond to different measurement time units; sending, within different measurement time units respectively corresponding to the multiple measurement resource subsets, a channel state information reference signal.

In an embodiment, configuring the measurement time units respectively corresponding to the multiple measurement resource subsets for performing channel state information reference signal measurement includes: configuring a measurement time unit for each of the multiple measurement resource subsets, wherein the measurement time units corresponding to the multiple measurement resource subsets are independent of each other.

In an embodiment, the multiple measurement resource subsets include first-part measurement resource subsets and second-part measurement resource subsets; the first-part measurement resource subsets correspond to first measurement time units and the second-part measurement resource subsets correspond to second measurement time units; there is an association relationship between the first measurement time units and the second measurement time units.

In an embodiment, each of the measurement time units includes a measurement slot; configuring the measurement time units, respectively corresponding to the multiple measurement resource subsets for performing channel state information reference signal measurement includes: configuring a same measurement period and different slot offsets for the multiple measurement resource subsets, respectively.

In an embodiment, configuring the measurement time units respectively corresponding to the multiple measurement resource subsets for performing channel state information reference signal measurement includes: configuring a common measurement period and a common slot offset for the multiple measurement resource subsets.

In an embodiment, resource element positions of the channel state information reference signal in a physical resource block in different measurement slots are the same.

In an embodiment, the measurement slots are continuous in time.

In an embodiment, configuring the measurement time units respectively corresponding to the multiple measurement resource subsets for performing channel state information reference signal measurement includes: configuring different symbols in a same slot for the multiple measurement resource subsets.

In an embodiment, there is a symbol interval between different symbols.

In an embodiment, configuring the measurement time units respectively corresponding to the multiple measurement resource subsets for performing channel state information reference signal measurement includes: configuring a symbol for each of the multiple measurement resource subsets, where the symbols corresponding to the multiple measurement resource subsets are independent of each other.

In an embodiment, configuring the measurement time units respectively corresponding to the multiple measurement resource subsets for performing channel state information reference signal measurement includes: configuring a common symbol for the multiple measurement resource subsets.

According to a third aspect of embodiments of the present disclosure, there is provided a channel state information measurement apparatus, which is applied to a terminal. The channel state information measurement apparatus includes:

a determining unit, configured to determine multiple measurement resource subsets for performing channel state information reference signal measurement and measurement time units respectively corresponding to the multiple measurement resource subsets, where different measurement resource subsets correspond to different measurement time units; a measuring unit, configured to, within the measurement time units corresponding to the multiple measurement resource subsets, measure a channel state information reference signal.

In an embodiment, each of the multiple measurement resource subsets is configured with a measurement time unit, and the measurement time units corresponding to the multiple measurement resource subsets are independently configured with respect to each other.

In an embodiment, the multiple measurement resource subsets include first-part measurement resource subsets and second-part measurement resource subsets; the first-part measurement resource subsets correspond to first measurement time units, and the second-part measurement resource subsets correspond to second measurement time units; there is an association relationship between the first measurement time units and the second measurement time units.

In an embodiment, each of the measurement time units includes a measurement slot, and the multiple measurement resource subsets are respectively configured with a same measurement period and different slot offsets.

In an embodiment, each of the measurement time units includes a measurement slot, and the first measurement time units and the second measurement time units are different measurement slots determined based on a common measurement period and a common slot offset.

In an embodiment, resource element positions of the channel state information reference signal in a physical resource block in different measurement slots are the same.

In an embodiment, the measurement slots are continuous in time.

In an embodiment, the measurement time units corresponding to the multiple measurement resource subsets are different symbols in a same slot.

In an embodiment, there is a symbol interval between different symbols.

In an embodiment, the measurement time units, respectively corresponding to the multiple measurement resource subsets, are independently-configured symbols.

In an embodiment, the measurement time units, respectively corresponding to the multiple measurement resource subsets, are determined based on a common symbol.

According to a fourth aspect of the embodiments of the present disclosure, there is provided a channel state information measurement apparatus, which is applied to a network device. The channel state information measurement apparatus includes: a configuring unit, configured to configure measurement time units respectively corresponding to multiple measurement resource subsets for performing channel state information reference signal measurement, where different measurement resource subsets correspond to different measurement time units; a sending unit, configured to, within different measurement time units respectively corresponding to the multiple measurement resource subsets, send a channel state information reference signal.

In an embodiment, the configuring unit is configured to configure a measurement time unit for each of the multiple measurement resource subsets, where the measurement time units corresponding to the multiple measurement resource subsets are independent of each other.

In an embodiment, the multiple measurement resource subsets include first-part measurement resource subsets and second-part measurement resource subsets; the first-part measurement resource subsets correspond to first measurement time units, and the second-part measurement resource subsets correspond to second measurement time units; there is an association relationship between the first measurement time units and the second measurement time units.

In an embodiment, each of the measurement time units includes a measurement slot; the configuring unit configures a same measurement period and different slot offsets for the multiple measurement resource subsets, respectively.

In an embodiment, the configuring unit configures a common measurement period and a common slot offset for the multiple measurement resource subsets.

In an embodiment, resource element positions of the channel state information reference signal in a physical resource block in different measurement slots are the same.

In an embodiment, the measurement slots are continuous in time.

In an embodiment, the configuring unit configures different symbols in a same slot for the multiple measurement resource subsets.

In an embodiment, there is a symbol interval between different symbols.

In an embodiment, the configuring unit configures a symbol for each of the multiple measurement resource subsets, where the symbols corresponding to the measurement resource subsets are independent of each other.

In an embodiment, the configuring unit configures a common symbol for the multiple measurement resource subsets.

According to a fifth aspect of embodiments of the present disclosure, there is provided a channel state information measurement apparatus, which includes:

a processor; and a memory configured to store processor executable instructions;

where the processor is configured to perform the channel state information measurement method according to the first aspect or any one embodiment of the first aspect.

According to a sixth aspect of embodiments of the present disclosure, there is provided a channel state information measurement apparatus, which includes:

a processor; and a memory configured to store processor executable instructions;

where the processor is configured to perform the channel state information measurement method according to the second aspect or any one embodiment of the second aspect.

According to a seventh aspect of embodiments of the present disclosure, there is provided a storage medium storing instructions, where the instructions in the storage medium are executed by a processor of a terminal to cause the terminal to perform the channel state information measurement method according to the first aspect or any one embodiment of the first aspect.

According to an eighth aspect of embodiments of the present disclosure, there is provided a storage medium storing instructions, where the instructions in the storage medium are executed by a processor of a network device to cause the network device to perform the channel state information measurement method according to the second aspect or any one embodiment of the second aspect.

The technical solutions of the embodiments of the present disclosure may include the following beneficial effects: when there are multiple measurement resource subsets for performing channel state information reference signal measurement, the multiple measurement resource subsets correspond to different measurement time units, and measuring a channel state information reference signal within different measurement time units is achieved. Further, the configuration time for the channel state information reference signal is enhanced, such that the Redcap terminal can measure BWP greater than the reception and transmission bandwidth of the terminal.

It should be understood that the above general descriptions and subsequent detailed descriptions are merely illustrative and explanatory rather than limiting of the present disclosure.

BRIEF DESCRIPTION OF DRAWINGS

The drawings herein incorporated in and constitute a part of the specification illustrate embodiments of the present disclosure and interpret the principle of the present disclosure together with the specification.

FIG. 4 is a schematic diagram illustrating a table for determining a RE in one PRB according to an exemplary embodiment of the present disclosure.

FIG. 5 is a schematic diagram of determining a starting symbol signaling according to an exemplary embodiment of the present disclosure.

FIG. 6 is a schematic diagram of performing data frequency hopping or selecting good frequency band part for data transmission according to an exemplary embodiment of the present disclosure.

DETAILED DESCRIPTION

Figures 1, 2, 3:
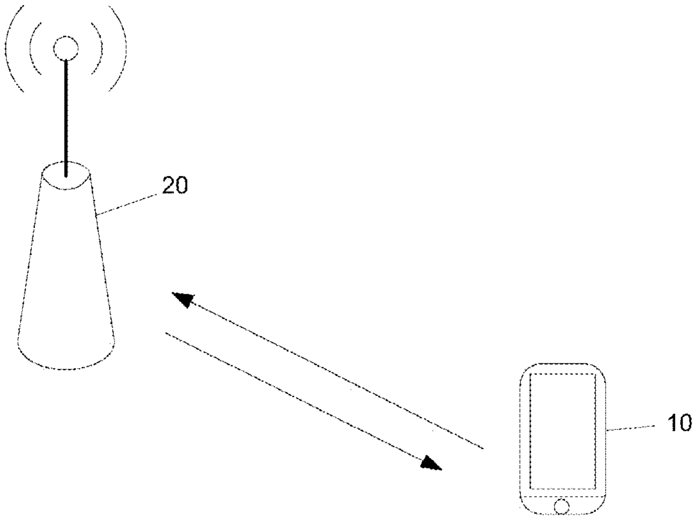
FIG. 1 is a schematic diagram illustrating a wireless communication system according to an exemplary embodiment of the present disclosure.
FIG. 2 is a schematic diagram of determining a frequency domain position signaling according to an exemplary embodiment of the present disclosure.
FIG. 3 is a schematic diagram of a table including a slot number according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The channel state information measurement method provided by the embodiments of the present disclosure may be applied to a wireless communication system shown in FIG. 1. As shown in FIG. 1, the wireless communication system includes a terminal 10 and a network device 20. Information transmission and reception are performed between the terminal and the network device via radio resources.

It should be understood that the wireless communication system shown in FIG. 1 is only illustrative and may further include other network devices, for example, may further include a core network device, a wireless repeater device and a wireless backhaul device and the like, which are not shown in FIG. 1. The number of the network devices and the number of the terminals included in the wireless communication system are not limited in the embodiments of the present disclosure.

It can be further understood that, the wireless communication system in the embodiments of the present disclosure is a network providing wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), and Carrier Sense Multiple Access with Collision Avoidance. Based on the capacity, rate, and delay and the like of different networks, the networks can be divided into 2G (second generation) network, 3G network, 4G network, and future evolution network such as 5G network, which is also called new radio (NR). For ease of descriptions, the wireless communication network can be sometimes simply referred to as network in the present disclosure.

Furthermore, the network device involved in the present disclosure may also be referred to as wireless access network device. The wireless access network device may be a base station, an evolved node B, a Femtocell, an access point (AP) in a wireless fidelity (WIFI) system, a wireless repeater node, a wireless backhaul node, a transmission point (TP), or a transmission and reception point (TRP) or the like, or may be a gNR in an NR system, or may be a component or a part of equipment forming a base station or the like. In a case of a Vehicle-to-Everything (V2X) communication system, the network device may also be a vehicle-mounted device. It should be understood that in the embodiments of the present disclosure, the specific technology and specific equipment morphology adopted by the network device are not limited.

Furthermore, the terminal involved in the present disclosure may also be referred to as a terminal device, a user equipment (UE), a Mobile Station (MS), a Mobile Terminal (MT) or the like, which is a device providing voice and/or data connectivity to the users. For example, the terminal may be a palm-held device or a vehicle-mounted device or the like having wireless connection function. At present, some terminals may be, for example, mobile phones, pocket personal computers (PPC), palmtop computers, Personal Digital Assistants (PDA), laptop computers, tablet computers, wearable devices, or vehicle-mounted devices or the like. Furthermore, in a case of a Vehicle-to-Everything (V2X) communication system, the terminal device may also be a vehicle-mounted vehicle. It should be understood that in the embodiments of the present disclosure, the specific technology and specific equipment morphology adopted by the terminal are not limited.

The terminal involved in the embodiments of the present disclosure may be understood as a new type of terminal designed in the 5G NR: reduced capability UE or NR-lite for short. In the embodiments of the present disclosure, the new terminal is called Redcap terminal or 5G NR-lite.

Similar to the Internet-of-things (IoT) device in the Long Term Evolution (LTE), the 5G NR-lite usually needs to satisfy the following requirements:

Low cost and low complexity,

Coverage enhancement to some degree

Power saving

Due to its limited capability, the Redcap terminal has a transmission and reception bandwidth of only 20 HHz in case of FR1 (Frequency Range 1) and only 100 MHz in case of FR2. During channel state information (CSI) measurement configuration, the measurement configuration information includes resource block (RB) information included in measurement resource in the BWP (Bandwidth Part) where the measurement configuration information is located, where the RB information includes a starting RB and a number of the RBs (starting RB+number of RBs). The terminal needs to monitor one segment of continuous frequency band for CSI measurement. The RB information further includes a time domain position where the CSI is located and a position of a resource element (RE) in a Physical Resource Block (PRB).

In the related arts, a frequency domain position may be determined based on the starting RB and the number of the RBs, for example, determined in the manner shown in FIG. 2. Furthermore, a time domain position for CSI measurement may be determined based on a CSI measurement period and a slot offset and the like, where the time domain position includes a slot position for CSI transmission. For example, the slot position may be determined in the following formula:

$$\left(N_{slot}^{frame,\mu} n_f + n_{s,f}^{\mu} - T_{offset}\right) \bmod T_{CSI\text{-}RS} = 0$$

where $$N_{slot}^{frame,\mu}$$

refers to a number of slots within one frame, $n_f$ refers to a frame index, $$n^{u}_{s,f}$$

refers to a slot index within one frame, $T_{offset}$ refers to a slot offset, $T_{CSI\text{-}RS}$ refers to a CSI measurement period.

$$N^{frame,\mu}_{slot}$$

may be determined based on the table shown in FIG. 3, and $T_{offset}$ and $T_{CSI\text{-}RS}$ may be determined based on a Radio Resource Control (RRC) message. As a result, $$n^{u}_{s,f}$$

in the f can be determined in the above formula, that is, the slot position is determined.

Furthermore, the RE in one PRB may be determined based on a sub-carrier serial number where the RE is located and Orthogonal Frequency Division Multiplexing (OFDM), for example, may be determined by using the table shown in FIG. 4, where the starting symbol may be determined based on the signaling shown in FIG. 5.

In the related arts, in order to enable the Redcap terminal with limited bandwidth to better obtain frequency diversity or frequency selective gain, a BWP greater than the bandwidth of the terminal is configured for the terminal, or multiple frequency band parts are configured for the terminal. Each frequency band part is within the bandwidth capability range of the terminal, and the terminal can perform data frequency hopping within the several frequency bands or select good frequency band parts for data transmission as shown in FIG. 6. However, due to the limited bandwidth of the terminal, the terminal cannot measure all resources at the same time. At this time, it is required to segment the measurement resources, to perform measurement on different measurement resource subsets.

An embodiment of the present disclosure provides a channel state information measurement method. In this method, configuration time for a channel state information reference signal (CSI-RS) is enhanced, such that the Redcap terminal can measure BWP greater than the reception and transmission bandwidth of the terminal.

In an implementation, in an embodiment of the present disclosure, multiple measurement resource subsets for performing channel state information reference signal measurement are configured with different measurement time units respectively. A network device sends a channel state information reference signal on the different measurement time units. A terminal measures the channel state information reference signal within the measurement time units corresponding to the multiple measurement resource subsets.

In the embodiments of the present disclosure, the multiple measurement resource subsets for performing channel state information reference signal measurement may include a sub-band or a frequency band. That is, the network device may perform CSI-RS configuration based on the sub-band or frequency band. Each sub-band or frequency band is within the bandwidth range of the terminal. The frequency resource to be monitored by the terminal is formed by multiple sub-bands or frequency bands. These frequency bands or sub-bands may be disperse or continuous in a frequency domain. The frequency bands or sub-bands belong to a same frequency unit (e.g., BWP) or to different frequency units. The frequency bands or sub-bands may be explicitly network-configured or determined based on a preset rule.

Figure 7:
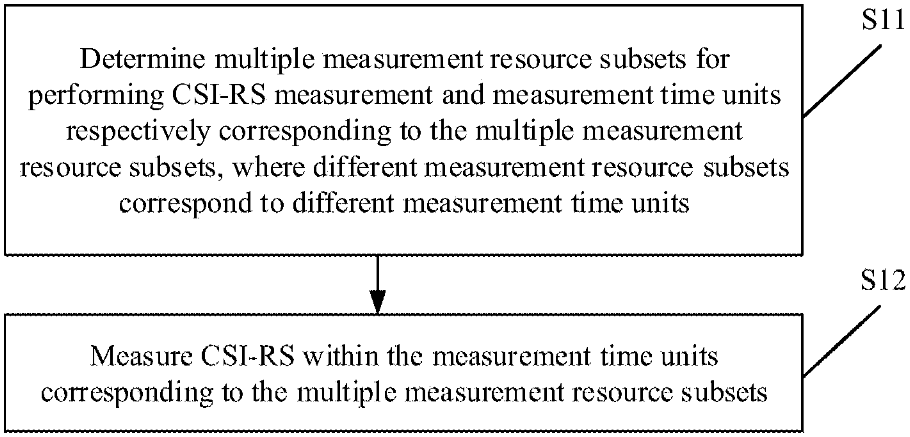
FIG. 7 is a flowchart illustrating a channel state information measurement method according to an exemplary embodiment of the present disclosure.

FIG. 7 is a flowchart illustrating a channel state information measurement method according to an exemplary embodiment. As shown in FIG. 7, the channel state information measurement method may be performed by a terminal and includes the following steps.

At step S11, multiple measurement resource subsets for performing CSI-RS measurement and measurement time units, respectively, corresponding to the multiple measurement resource subsets are determined.

Different subsets of measurement resource correspond to different measurement time units.

At step S12, CSI-RS is measured within the measurement time units corresponding to the multiple measurement resource subsets.

In the channel state information measurement method provided by the embodiments of the present disclosure, multiple measurement resource subsets are used to perform CSI-RS configuration. The multiple measurement resource subsets are within the bandwidth range of the terminal. The frequency resource to be monitored by the terminal is formed by multiple measurement resource subsets. The multiple measurement resource subsets may be disperse or continuous in the frequency domain, and the multiple measurement resource subsets belong to a same frequency unit (e.g., BWP) or to different frequency units. The multiple measurement resource subsets may be explicitly network-configured or determined based on a preset rule.

In the channel state information measurement method provided by the embodiments of the present disclosure, the multiple measurement resource subsets respectively correspond to the measurement time units, and different measurement resource subsets correspond to different measurement time units. In this way, the channel state information reference signal can be measured within different measurement time units. Further, the configuration time for the channel state information reference signal is enhanced, such that the Redcap terminal can measure BWP greater than the reception and transmission bandwidth of the terminal.

Furthermore, the measurement time units involved in the embodiments of the present disclosure may be measurement slots or OFDM (Orthogonal Frequency Division Multiplexing) symbols.

In an example, in response to the measurement time units, which include measurement slots, different measurement resource subsets correspond to measurement slots, respectively, that is, the different measurement resource subsets correspond to different measurement slots. For example, when the measurement resource subsets include multiple frequency bands or sub-bands, the multiple frequency bands or sub-bands to be measured correspond to measurement slots respectively, and each frequency band or sub-band corresponds to a different measurement slot.

In another example, in response to the measurement time units including symbols, different measurement resource subsets correspond to symbols respectively, that is, different measurement resource subsets correspond to different symbols. For example, when the measurement resource subsets include multiple frequency bands or sub-bands, the multiple frequency bands or sub-bands to be measured correspond to symbols respectively, and each frequency band or sub-band corresponds to a different symbol.

In an implementation, in the channel state information measurement method provided by the embodiments of the present disclosure, in response to the measurement time units, which include measurement slots, RE positions of the channel state information reference signal in the PRB in different measurement slots are the same.

In an implementation, in the channel state information measurement method provided by the embodiments of the present disclosure, in response to the measurement time units, which include measurement slots, the measurement slots are continuous in time.

In an implementation, in the channel state information measurement method provided by the embodiments of the present disclosure, in response to the measurement time units including symbols, the measurement time units corresponding to the multiple measurement resource subsets are different symbols in a same slot. That is, in a same slot, CSI-RS measurement can be performed for different measurement resource subsets in different symbols. For example, when the measurement resource subsets include multiple frequency bands or sub-bands, the multiple frequency bands or sub-bands to be measured correspond to different symbols in a same slot, and different sub-bands or frequency bands can be measured in different symbols.

In the channel state information measurement method provided by the embodiments of the present disclosure, in response to the measurement time units including symbols, there is a symbol interval between different symbols, that is, there is an interval between OFDM symbols occupied by the CSI-RSs included in different sub-bands or frequency bands such that the terminal can perform RF (resource frequency) retuning.

In an implementation of the embodiments of the present disclosure, each of the multiple measurement resource subsets is configured with a measurement time unit, and the measurement time units corresponding to the multiple measurement resource subsets are independently configured with each other.

In an example, in response to the measurement time units include measurement slots, different measurement resource subsets are independently configured with a measurement slot respectively. For example, when the measurement resource subsets include multiple frequency bands or sub-bands, the multiple frequency bands or sub-bands to be measured are configured with a measurement slot respectively, and the measurement slot corresponding to each frequency band or sub-band is independently configured.

In the channel state information measurement method provided by the embodiments of the present disclosure, when different measurement resource subsets are independently configured with a measurement slot respectively, the multiple measurement resource subsets are configured with a same measurement period and different slot offsets respectively. For example, the multiple measurement resource subsets include multiple sub-bands, and multiple different sub-bands are independently configured with a measurement period and different slot offsets, respectively.

In another example, in response to the measurement time units including symbols, the measurement time units corresponding to the multiple measurement resource subsets, respectively, are independently-configured symbols, that is, the multiple measurement resource subsets are independently configured with a symbol, respectively. For example, when the measurement resource subsets include multiple frequency bands or sub-bands, the multiple frequency bands or sub-bands to be measured are configured with an OFDM symbol (L0) respectively, that is, the multiple measurement resource subsets are independently configured with an OFDM symbol (L0) respectively.

In the channel state information measurement method provided by the embodiments of the present disclosure, there is an association relationship between the measurement time units corresponding to the multiple measurement resource subsets, for example, between the multiple measurement time units determined based on a common measurement time unit.

In the embodiments of the present disclosure, for ease of descriptions, measurement resource subsets corresponding to the measurement time units in an association relationship in the multiple measurement resource subsets are referred to first-part measurement resource subsets and second-part measurement resource subsets, that is, the multiple measurement resource subsets include the first-part measurement resource subsets and the second-part measurement resource subsets. The first-part measurement resource subsets correspond to first measurement time units and the second-part measurement resource subsets correspond to second measurement time units. There is an association relationship between the first measurement time units and the second measurement time units.

Furthermore, the measurement time units involved in the embodiments of the present disclosure may be measurement slots or OFDM symbols.

Figure 8:
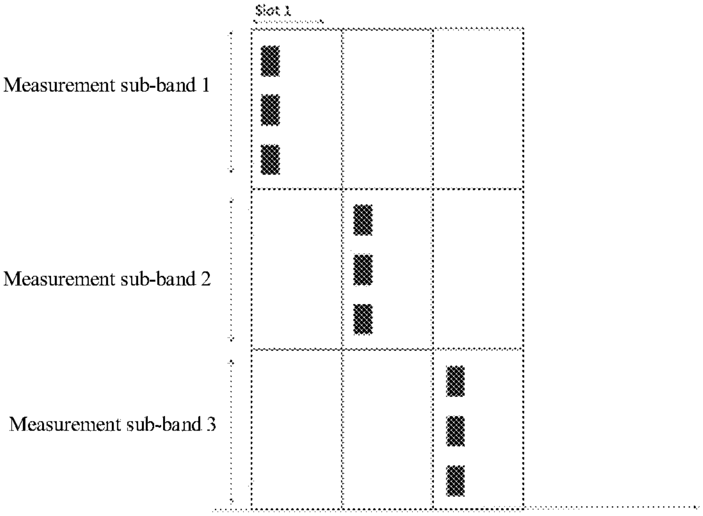
FIG. 8 is a schematic diagram of multiple associated measurement slots corresponding to different sub-bands according to an exemplary embodiment of the present disclosure.

In an embodiment, in the channel state information measurement method provided by the embodiments of the present disclosure, in response to the measurement time units include measurement slots, multiple measurement resource subsets (multiple sub-bands or frequency bands) to be measured are configured with associated measurement slots. The associated measurement slots may be different measurement slots determined based on a common measurement period and a common slot offset. For example, the network device configures one common measurement period and one common slot offset. The terminal may determine a starting time based on the common measurement period and the common slot offset. The terminal measures a first measurement resource subset at the determined starting time, and then measures a second measurement resource subset in a next slot after the starting time, and so on. For example, in response to the measurement resource subsets are sub-bands, the schematic diagram of multiple associated measurement slots corresponding to different sub-bands is as shown in FIG. 8.

Figure 9:
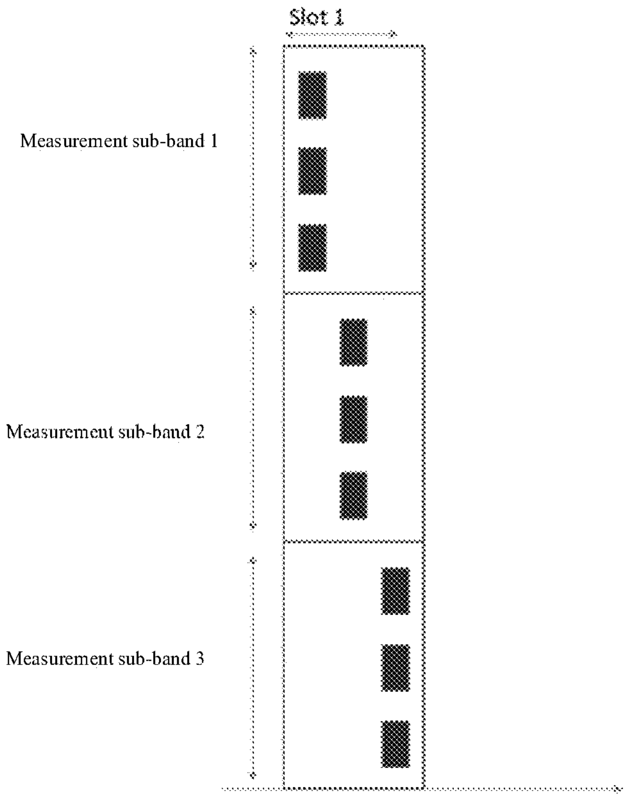
FIG. 9 is a schematic diagram of multiple associated symbols corresponding to different sub-bands according to an exemplary embodiment of the present disclosure.

In an implementation, in the channel state information measurement method provided by the embodiments of the present disclosure, in response to the measurement time units including symbols, the measurement time units corresponding to the multiple measurement resource subsets, respectively are determined based on a common symbol. For example, the network device configures one common L0 as a starting OFDM symbol for measurement. During subsequent CSI-RS measurement of the terminal, symbol-level translations are performed in sequence to carry out CSI-RS measurement on different measurement resource subsets in different OFDM symbols in a same slot. For example, in response to the measurement resource subsets are sub-bands, the schematic diagram of multiple associated symbols corresponding to different sub-bands is as shown in FIG. 9.

In the channel state information measurement method provided by the embodiments of the present disclosure, when the channel state information measurement resource of the terminal is greater than the reception and transmission bandwidth of the terminal, multiple measured CSI-RSs are transmitted in different measurement time units (measurement slots or OFDM symbols). In this way, the configuration time for the channel state information reference signal is enhanced, such that the Redcap terminal can measure BWP greater than the reception and transmission bandwidth of the terminal.

Based on the same idea, an embodiment of the present disclosure provides a channel state information measurement method performed by a network device.

Figure 10:
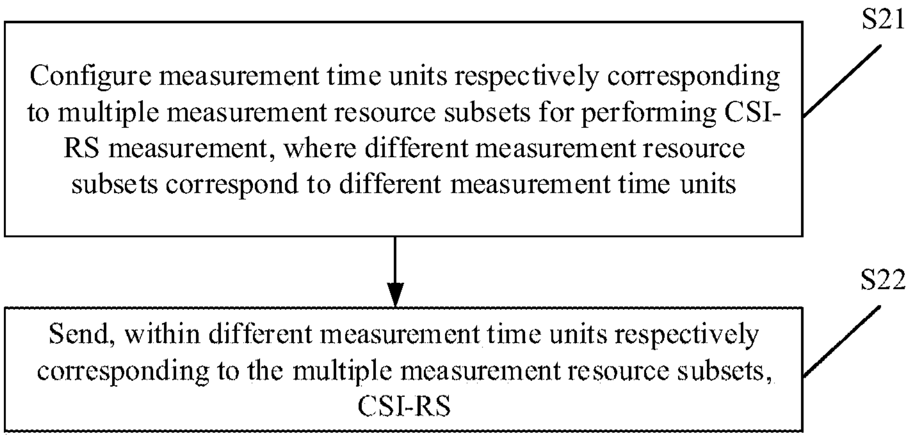
FIG. 10 is a flowchart illustrating a channel state information measurement method according to an exemplary embodiment of the present disclosure.

FIG. 10 is a flowchart illustrating a channel state information measurement method according to an exemplary embodiment of the present disclosure. As shown in FIG. 10, the channel state information measurement method is performed by a network device and includes the following steps.

At step S21, measurement time units respectively corresponding to multiple measurement resource subsets for performing CSI-RS measurement are configured, where different measurement resource subsets correspond to different measurement time units.

At step S22, within different measurement time units, respectively corresponding to the multiple measurement resource subsets, CSI-RS is sent.

In the channel state information measurement method provided by the embodiments of the present disclosure, when the measurement time units respectively corresponding to the multiple measurement resource subsets for performing CSI-RS measurement are configured, a measurement time unit may be configured for each of the multiple measurement resource subsets, and the measurement time units corresponding to the multiple measurement resource subsets are independent with each other.

Figure 11:
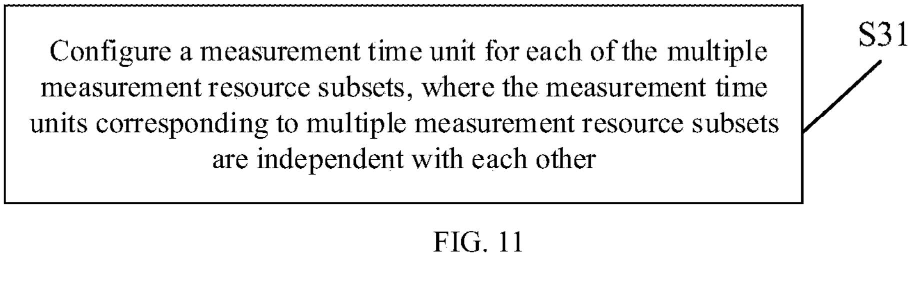
FIG. 11 is a flowchart illustrating a channel state information measurement method according to an exemplary embodiment of the present disclosure.

FIG. 11 is a flowchart illustrating a channel state information measurement method according to an exemplary embodiment of the present disclosure. As shown in FIG. 11, the channel state information measurement method is performed by a network device and includes the following steps.

At step S31, a measurement time unit is configured for each of the multiple measurement resource subsets, where the measurement time units corresponding to the multiple measurement resource subsets are independent with each other.

The measurement time units involved in the embodiments of the present disclosure may be measurement slots or OFDM symbols.

In an example, in response to the measurement time units, which include measurement slots, when the measurement time units, respectively corresponding to the multiple measurement resource subsets for performing CSI-RS measurement, are configured, the multiple measurement resource subsets to be measured are configured in different slots to send CSI-RS. For example, when the measurement resource subsets include multiple frequency bands or sub-bands, the multiple frequency bands or sub-bands to be measured are configured in different slots to send CSI-RS.

In an implementation, in the channel state information measurement method provided by the embodiments of the present disclosure, in response to the measurement time units include measurement slots, RE positions of the channel state information reference signal in the PRB in different measurement slots are the same, that is, the positions of the CSI-RS in the PRB in different measurement slots are the same.

In an implementation, in the channel state information measurement method provided by the embodiments of the present disclosure, in response to the measurement time units, which include measurement slots, the measurement slots are continuous in time.

In another example, in response to the measurement time units include symbols, different measurement resource subsets correspond to symbols respectively, and the network device configures the multiple measurement resource subsets (sub-bands or frequency bands) to be measured in different OFDM symbols to send CSI-RS. That is, in a same slot, different sub-bands or frequency bands can be measured in different OFDM symbols.

In an implementation, there is an interval between OFDM symbols occupied by the CSI-RSs included in different sub-bands or frequency bands, such that the terminal can perform RF retuning.

In an implementation of the embodiments of the present disclosure, each of the multiple measurement resource subsets is configured with a measurement time unit, and the measurement time units corresponding to the measurement resource subsets are independently configured with respect to each other.

In an example, in response to the measurement time units including measurement slots, the network device may configure a same measurement period and different slot offsets for the multiple measurement resource subsets, respectively.

Figure 12:
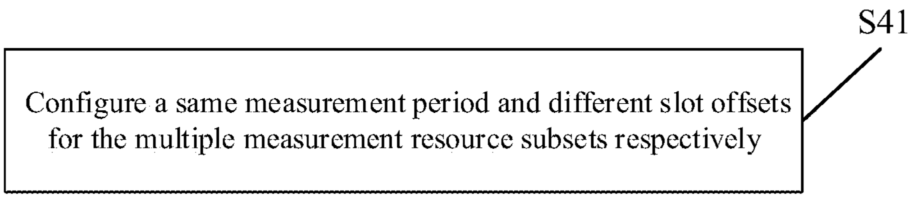
FIG. 12 is a flowchart illustrating a channel state information measurement method according to an exemplary embodiment of the present disclosure.

FIG. 12 is a flowchart illustrating a channel state information measurement method according to an exemplary embodiment of the present disclosure. As shown in FIG. 12, the channel state information measurement method is performed by a network device and includes the following steps.

At step S41, a same measurement period and different slot offsets are configured for the multiple measurement resource subsets, respectively.

The network device may independently configure a measurement period and different slot offsets for multiple different sub-bands respectively.

In another example, in response to the measurement time units including symbols, the network device may configure a symbol for each of the multiple measurement resource subsets, and the symbols corresponding to the measurement resource subsets are independent of each other.

Figure 13:
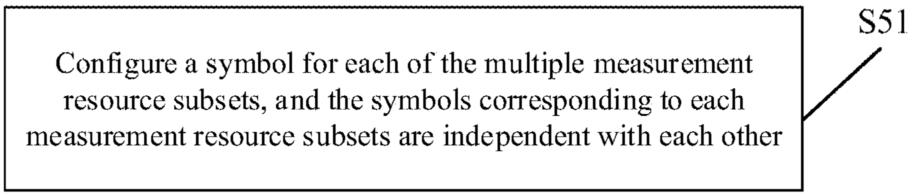
FIG. 13 is a flowchart illustrating a channel state information measurement method according to an exemplary embodiment of the present disclosure.

FIG. 13 is a flowchart illustrating a channel state information measurement method according to an exemplary embodiment of the present disclosure. As shown in FIG. 13, the channel state information measurement method is performed by a network device and includes the following steps.

At step S51, a symbol is configured for each of the multiple measurement resource subsets, and the symbols corresponding to the measurement resource subsets are independent of each other.

In the channel state information measurement method provided by the embodiments of the present disclosure, there is an association relationship between the measurement time units corresponding to the multiple measurement resource subsets, for example, between the multiple measurement time units determined based on a common measurement time unit.

In the embodiments of the present disclosure, for ease of description, the measurement resource subsets corresponding to the measurement time units in an association relationship in the multiple measurement resource subsets are referred to as first-part measurement resource subsets and second-part measurement resource subsets, that is, the multiple measurement resource subsets include the first-part measurement resource subsets and the second-part measurement resource subsets. The first-part measurement resource subsets correspond to the first measurement time units, and the second-part measurement resource subsets correspond to the second measurement time units. There is an association relationship between the first measurement time units and the second measurement time units.

Furthermore, the measurement time units involved in the embodiments of the present disclosure can be measurement slots or OFDM symbols.

In the channel state information measurement method provided by the embodiments of the present disclosure, in response to the measurement time units, which include measurement slots, multiple measurement resource subsets (multiple sub-bands or frequency bands) to be measured are configured with associated measurement slots. The associated measurement slots are different measurement slots determined based on a common measurement period and a common slot offset.

In an implementation, in the channel state information measurement method provided by the embodiments of the present disclosure, when the measurement time units respectively corresponding to the multiple measurement resource subsets for performing CSI-RS measurement are configured, a common measurement period and a common slot offset can be configured for the multiple measurement resource subsets.

Figure 14:
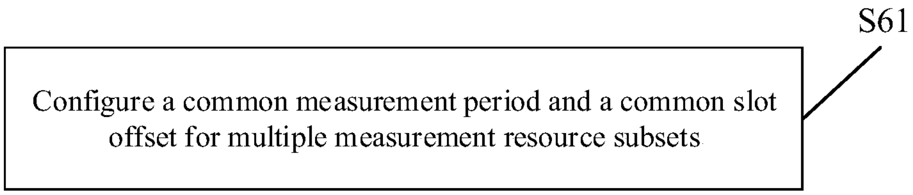
FIG. 14 is a flowchart illustrating a channel state information measurement method according to an exemplary embodiment of the present disclosure.

FIG. 14 is a flowchart illustrating a channel state information measurement method according to an exemplary embodiment of the present disclosure. As shown in FIG. 14, the channel state information measurement method is performed by a network device and includes the following steps.

At step S61, a common measurement period and a common slot offset are configured for multiple measurement resource subsets.

In an example, the network device configures one common measurement period and one common slot offset. The terminal can determine a starting time based on the common measurement period and the common slot offset. The terminal measures a first measurement resource subset at the determined starting time, and then measures a second measurement resource subset in the next slot after the starting time, and so on. For example, in response to the measurement resource subsets are sub-bands, the schematic diagram of multiple associated measurement slots corresponding to different sub-bands is as shown in FIG. 8.

In the channel state information measurement method provided by the embodiments of the present disclosure, in response to the measurement time units include symbols, the multiple measurement resource subsets (multiple sub-bands or frequency bands) to be measured are configured with an associated common symbol. When configuring the measurement time units respectively corresponding to the multiple measurement resource subsets for performing CSI-RS measurement, a common symbol may be configured for the multiple measurement resource subsets. The terminal may determine symbols respectively corresponding to the multiple measurement resource subsets based on the common symbol.

Figure 15:
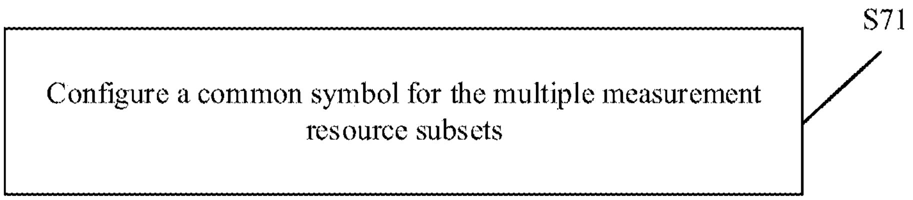
FIG. 15 is a flowchart illustrating a channel state information measurement method according to an exemplary embodiment of the present disclosure.

FIG. 15 is a flowchart illustrating a channel state information measurement method according to an exemplary embodiment of the present disclosure. As shown in FIG. 15, the channel state information measurement method is performed by a network device and includes the following steps.

At step S71, a common symbol is configured for the multiple measurement resource subsets.

In an example, the network device configures one common L0 as a starting OFDM symbol for measurement. During subsequent CSI-RS measurement of the terminal, symbol-level translations are performed in sequence to carry out CSI-RS measurement on different measurement resource subsets in different OFDM symbols in a same slot. For example, in response to the measurement resource subsets are sub-bands, the schematic diagram of multiple associated symbols corresponding to different sub-bands is as shown in FIG. 9.

It can be understood that the channel state information measurement method provided by the embodiments of the present disclosure is applicable to achieving channel state information measurement through an interaction process of the network device and the terminal. The process of achieving channel state information measurement through interaction of the network device and the terminal will no longer be detailed in this embodiment of the present disclosure.

It should be noted that those skilled in the arts can understand that various implementations/examples involved in the embodiments of the present disclosure can be used in cooperation with the preceding embodiments or independently. The implementation principle is the same regardless of the separate use or use in cooperation with the preceding embodiments. In the embodiments of the present disclosure, some embodiments are illustrated by the implementation of a combination use. Of course, those skilled in the arts may understand that such illustrative descriptions are not intended to limit the embodiments of the present disclosure.

Based on the same idea, an embodiment of the present disclosure provides a channel state information measurement apparatus.

It can be understood that the channel state information measurement apparatus provided by the embodiments of the present disclosure includes corresponding hardware structures and/or software modules for executing various functions in order to achieve the above functions. In combination with various example units and algorithm steps in the embodiments of the present disclosure, the embodiments of the present disclosure can be implemented by hardware or a combination of hardware and computer software. Whether a particular function is to be executed by hardware or by computer software driving hardware depends on the specific applications or designed constraint conditions of the technical solutions. Those skilled in the arts may use a different method for each specific application to achieve the described functions, but such implementations shall not be understood as exceeding the scope of technical solutions of the embodiments of the present disclosure.

Figure 16:
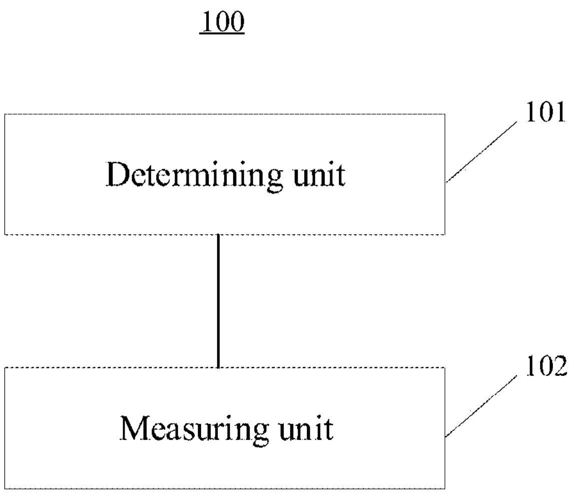
FIG. 16 is a block diagram illustrating a channel state information measurement apparatus according to an exemplary embodiment of the present disclosure.

FIG. 16 is a block diagram illustrating a channel state information measurement apparatus according to an exemplary embodiment of the present disclosure. As shown in FIG. 16, the channel state information measurement apparatus 100 is applied to a terminal and includes a determining unit 101 and a measuring unit 102.

The determining unit 101 is configured to determine multiple measurement resource subsets for performing CSI-RS measurement and measurement time units, respectively, corresponding to the multiple measurement resource subsets, where different measurement resource subsets correspond to different measurement time units. The measuring unit 102 is configured to, within the measurement time units corresponding to the multiple measurement resource subsets, measure CSI-RS.

In an implementation, each of the multiple measurement resource subsets is configured with a measurement time unit, and the measurement time units corresponding to the measurement resource subsets are independently configured with respect to each other.

In an implementation, the multiple measurement resource subsets include first-part measurement resource subsets and second-part measurement resource subsets; the first-part measurement resource subsets correspond to first measurement time units and the second-part measurement resource subsets correspond to second measurement time units; there is an association relationship between the first measurement time units and the second measurement time units.

In an implementation, the measurement time units include measurement slots, and the multiple measurement resource subsets are respectively configured with a same measurement period and different slot offsets.

In an implementation, the measurement time units include measurement slots, and the first measurement time units and the second measurement time units are different measurement slots determined based on a common measurement period and a common slot offset.

In an implementation, resource element positions of the CSI-RS in a physical resource block in different measurement slots are the same.

In an implementation, the measurement slots are continuous in time.

In an implementation, the measurement time units corresponding to the multiple measurement resource subsets are different symbols in a same slot.

In an implementation, there is a symbol interval between different symbols.

In an implementation, the measurement time units respectively corresponding to the multiple measurement resource subsets are independently-configured symbols.

In an implementation, the measurement time units respectively corresponding to the multiple measurement resource subsets are determined based on a common symbol.

Figure 17:
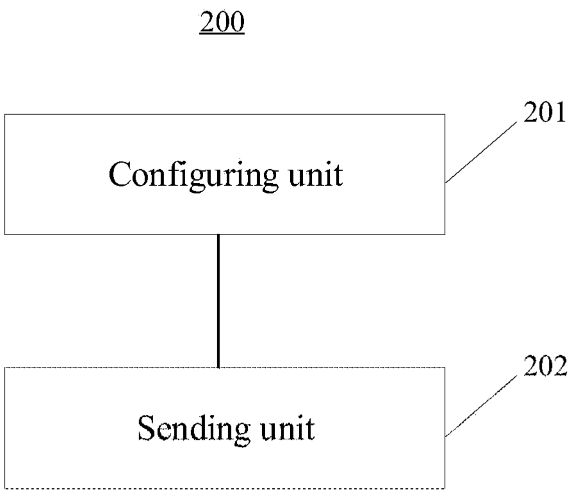
FIG. 17 is a block diagram illustrating a channel state information measurement apparatus according to an exemplary embodiment of the present disclosure.

FIG. 17 is a block diagram illustrating a channel state information measurement apparatus according to an exemplary embodiment of the present disclosure. As shown in FIG. 17, the channel state information measurement apparatus 200 is applied to a network device and includes a configuring unit 201 and a sending unit 202.

The configuring unit 201 is configured to configure measurement time units, respectively corresponding to multiple measurement resource subsets for performing CSI-RS measurement, where different measurement resource subsets correspond to different measurement time units. The sending unit 202 is configured to, within different measurement time units respectively corresponding to the multiple measurement resource subsets, send CSI-RS.

In an implementation, the configuring unit 201 configures a measurement time unit for each of the multiple measurement resource subsets, where the measurement time units corresponding to the measurement resource subsets are independent of each other.

In an implementation, the multiple measurement resource subsets include first-part measurement resource subsets and second-part measurement resource subsets; the first-part measurement resource subsets correspond to first measurement time units and the second-part measurement resource subsets correspond to second measurement time units; there is an association relationship between the first measurement time units and the second measurement time units.

In an implementation, the measurement time units include measurement slots, and the configuring unit 201 configures a same measurement period and different slot offsets for the multiple measurement resource subsets, respectively.

In an implementation, the configuring unit 201 configures a common measurement period and a common slot offset for the multiple measurement resource subsets.

In an implementation, resource element positions of the CSI-RS in a physical resource block in different measurement slots are the same.

In an implementation, the measurement slots are continuous in time.

In an implementation, the configuring unit 201 configures different symbols in a same slot for the multiple measurement resource subsets.

In an implementation, there is a symbol interval between different symbols.

In an implementation, the configuring unit 201 configures a symbol for each of the multiple measurement resource subsets, where the symbol corresponding to each multiple measurement resource subset is independent.

In an implementation, the configuring unit 201 configures a common symbol for the multiple measurement resource subsets.

The specific manner in which each module in the apparatuses in the above embodiments executes operations has already been detailed in the method-related embodiments and will not be repeated herein.

Figure 18:
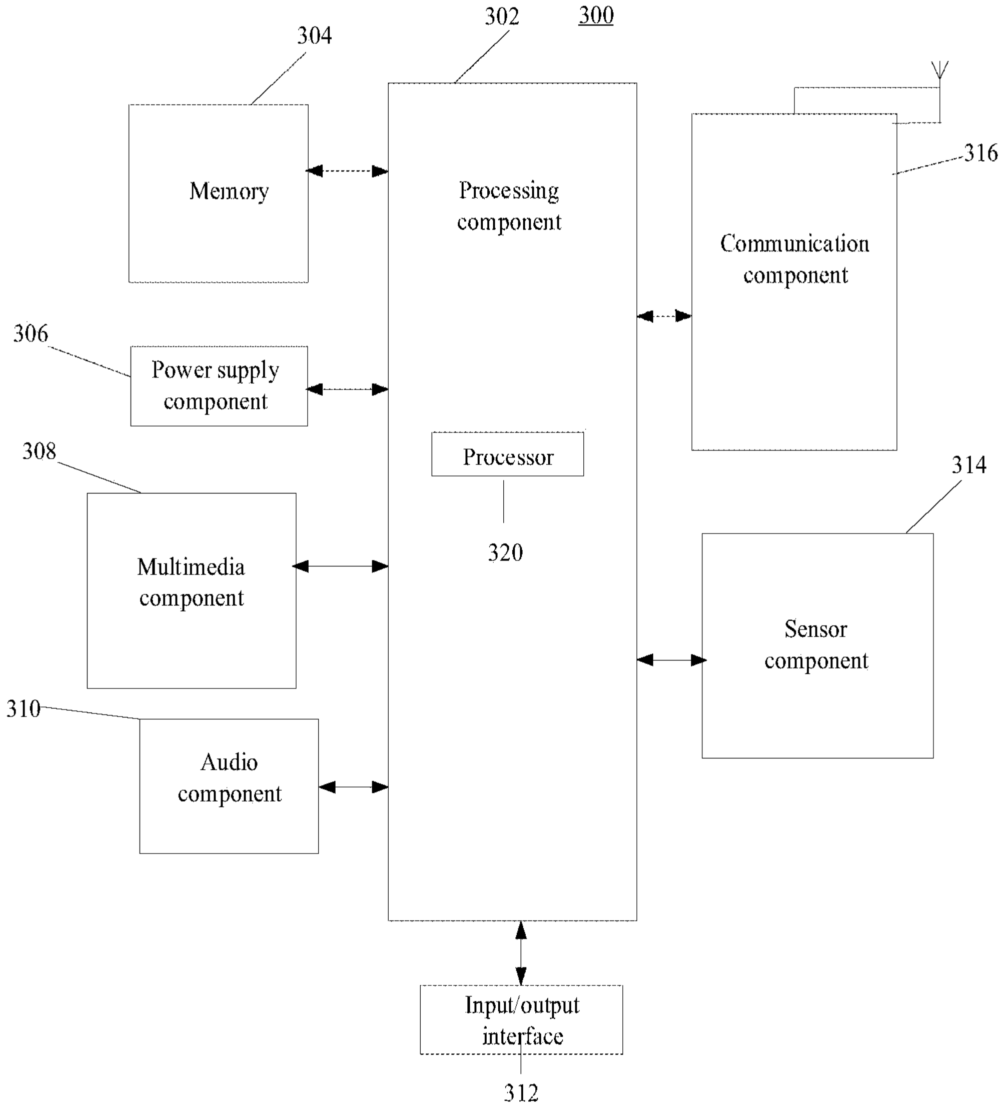
FIG. 18 is a block diagram illustrating an apparatus for channel state information measurement according to an exemplary embodiment of the present disclosure.

FIG. 18 is a block diagram illustrating an apparatus 300 for channel state information measurement according to an exemplary embodiment of the present disclosure. For example, the apparatus 300 may be mobile phone, computer, digital broadcast terminal, message transceiver, game console, tablet computer, medical device, fitness device and personal digital assistant and the like.

As shown in FIG. 18, the apparatus 300 may include one or more of the following components: a processing component 302, a memory 304, a power supply component 306, a multimedia component 308, an audio component 310, an input/output (I/O) interface 312, a sensor component 314 and a communication component 316.

The processing component 302 generally controls overall operations of the apparatus 300, such as operations associated with display, phone calls, data communications, camera operations, and recording operations. The processing component 302 may include one or more processors 320 to execute instructions to complete all or part of the steps of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any application or method operated on the apparatus 300, contact data, phonebook data, messages, pictures, videos, and so on. The memory 304 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 306 supplies power for different components of the apparatus 300. The power supply component 306 may include a power supply management system, one or more power supplies, and other components associated with generating, managing and distributing power for the apparatus 300.

The multimedia component 308 includes a screen that provides an output interface between the apparatus 300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 308 includes a front camera and/or a rear camera. When the apparatus 300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some examples, the audio component 310 also includes a loudspeaker for outputting an audio signal.

The I/O interface 312 provides an interface between the processing component 302 and a peripheral interface module which may be a keyboard, a click wheel, a button, or the like. These buttons may include, but are not limited to a home button, a volume button, a start button, and a lock button.

The sensor component 314 includes one or more sensors for providing a status assessment in various aspects to the apparatus 300. For example, the sensor component 314 may detect an open/closed state of the apparatus 300, and the relative positioning of components, for example, the component is a display and a keypad of the apparatus 300. The sensor component 314 may also detect a change in position of the apparatus 300 or a component of the apparatus 300, the presence or absence of a user in contact with the apparatus 300, the orientation or acceleration/deceleration of the apparatus 300 and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some examples, the sensor component 314 may also include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 2G or 3G, or a combination thereof. In an example, the communication component 316 receives broadcast signals or broadcast associated information from an external broadcast management system via a broadcast channel. In an example, the communication component 316 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 300 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an exemplary embodiment, there is provided a non-transitory computer readable storage medium including instructions, for example, a memory 304 including instructions, where the instructions are executed by a processor 320 of the apparatus 300 to perform the above methods. For example, the non-transitory computer readable storage medium may be a Read Only Memory (ROM), a Random Access Memory (RAM), a CD-ROM, a magnetic tape, a floppy disk, an optical data storage device, and the like.

Figure 19:
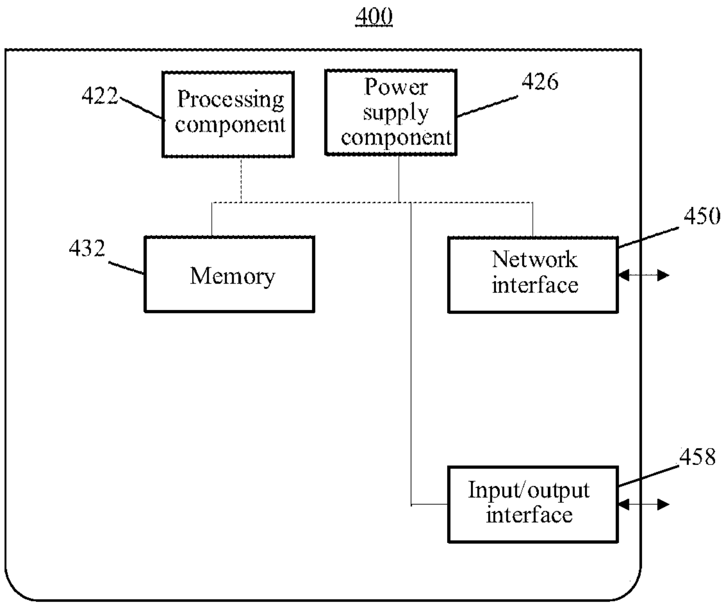
FIG. 19 is a block diagram illustrating an apparatus for channel state information measurement according to an exemplary embodiment of the present disclosure.

FIG. 19 is a block diagram illustrating an apparatus 400 for channel state information measurement according to an exemplary embodiment of the present disclosure. For example, the apparatus 400 may be provided as a server. As shown in FIG. 4, the apparatus 400 includes a processing component 422, and further includes one or more processors and a memory resource represented by a memory 432 for storing instructions executed by the processing component 422, for example, an application program. The application programs stored in the memory 432 may include one or more modules, each of which corresponds to one set of instructions. Furthermore, the processing component 422 is configured to execute instructions to perform the above methods.

The apparatus 400 further includes one power supply component 426 configured to execute power management for the apparatus 400, one wired or wireless network interface 450 configured to connect the apparatus 400 to a network, and one input/output (I/O) interface 458. The apparatus 400 may be operated based on an operating system stored in the memory 432, such as Windows Server™, Mac OS X™, Unix™, Linux™ and FreeBSD™.

In an illustrative embodiment, there is provided a non-transitory computer readable storage medium including instructions, for example, the memory 432 including instructions, where the instructions are executed by the processing component 422 of the apparatus 400 to perform the above methods. For example, the non-transitory computer readable storage medium may be a Read Only Memory (ROM), a Random Access Memory (RAM), a CD-ROM, a magnetic tape, a floppy disk, and an optical data storage device and the like.

It is further understood that the "plurality" in the present disclosure refers to two or more and is similar to other quantifiers. The term "and/or" is used to describe the association relationship of associated objects and represents the presence of three relationships, for example, A and/or B may represent that A exists alone, both A and B exist at the same time, and B exists alone. The character "/" generally represents an "or" relationship of the objects associated back and forth. The terms "a", "said" and "the" in singular form are also meant to include plural form, unless otherwise clearly stated in the context.

It can be further understood that the terms "first" and "second" and the like may be used to describe various information, but this information shall not be limited to these terms. These terms are used only to distinguish one category of information from another and not to represent a specific sequence or importance. Actually, the terms such as "first" and "second" can be exchanged mutually. For example, without departing from the scope of the present disclosure, the first information may be referred to as the second information, and similarly, the second information may also be referred to as the first information.

It can be further understood that, in the embodiments of the present disclosure, although operations are described in a specific sequence in the accompanying drawings, it shall not be understood as requiring that these operations are performed in the shown specific sequence or serial sequence, or that all operations shown are performed to achieve a desired result. In a specific environment, multi-task processing and parallel processing are possible and may also be advantageous.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the related art that are not disclosed in the present disclosure. The specification and examples are considered exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An information measurement method, performed by a Reduced capability (RedCap) terminal and comprising:

when a measurement resource of the RedCap terminal performing reference signal measurement is greater than a reception and transmission bandwidth of the RedCap terminal, determining multiple measurement resource subsets for performing the reference signal measurement and measurement time units respectively corresponding to the multiple measurement resource subsets, wherein bandwidths corresponding to multiple measurement resource subsets are greater than the reception and transmission bandwidth of the RedCap terminal;

wherein the multiple measurement resource subsets comprise first-part measurement resource subsets and second-part measurement resource subsets; wherein the measurement time units comprise a first measurement time unit and a second measurement time unit;

the first-part measurement resource subsets correspond to first measurement time units and the second-part measurement resource subsets correspond to second measurement time units;

there is an association relationship between the first measurement time units and the second measurement time units;

wherein the measurement time units comprise measurement slots, and the first measurement time units and the second measurement time units are different measurement slots determined based on a common measurement period and a common slot offset; and measuring, within the measurement time units corresponding to the multiple measurement resource subsets, a reference signal.

2. The information measurement method of claim 1, wherein each of the multiple measurement resource subsets is configured with a measurement time unit, and the measurement time units corresponding to the multiple measurement resource subsets are independently configured with each other.

3. The information measurement method of claim 2, wherein the multiple measurement resource subsets are respectively configured with a same measurement period and different slot offsets.

4. The information measurement method of claim 3, wherein resource element positions of the reference signal in a physical resource block in different measurement slots are same.

5. An information measurement method, performed by a network device and comprising:

when measurement resources of a Reduced capability (RedCap) terminal performing reference signal measurement are greater than a reception and transmission bandwidth of the RedCap terminal, configuring, for the RedCap terminal, measurement time units respectively corresponding to multiple measurement resource subsets for performing the reference signal measurement, wherein bandwidths corresponding to multiple measurement resource subsets are greater than the reception and transmission bandwidth of the RedCap terminal; wherein the multiple measurement resource subsets comprise first-part measurement resource subsets and second-part measurement resource subsets;

wherein the measurement time units comprise a first measurement time unit and a second measurement time unit; the first-part measurement resource subsets correspond to first measurement time units and the second-part measurement resource subsets correspond to second measurement time units; and when there is an association relationship between the first measurement time units and the second measurement time units, configuring a common measurement period and a common slot offset for the multiple measurement resource subsets;

wherein the measurement time units comprise measurement slots, and the first measurement time units and the second measurement time units are different measurement slots determined based on the common measurement period and the common slot offset;

sending, within different measurement time units respectively corresponding to the multiple measurement resource subsets, a reference signal.

6. The information measurement method of claim 5, wherein configuring the measurement time units respectively corresponding to the multiple measurement resource subsets for performing reference signal measurement comprises:

configuring a measurement time unit for each of the multiple measurement resource subsets, wherein the measurement time units corresponding to the multiple measurement resource subsets are independent with each other.

7. The information measurement method of claim 6, wherein configuring the measurement time units respectively corresponding to the multiple measurement resource subsets for performing reference signal measurement comprises:

configuring a same measurement period and different slot offsets for the multiple measurement resource subsets respectively.

8. The information measurement method of claim 7, wherein resource element positions of the reference signal in a physical resource block in different measurement slots are same.

9. A Reduced capability (RedCap) terminal, comprising:
a processor;
a memory, configured to store processor executable instructions;
wherein the processor is configured to perform operations comprising:
when a measurement resource of the RedCap terminal performing reference signal measurement is greater than a reception and transmission bandwidth of the RedCap terminal, determining multiple measurement resource subsets for performing the reference signal measurement and measurement time units respectively corresponding to the multiple measurement resource subsets, wherein bandwidths corresponding to multiple measurement resource subsets are greater than the reception and transmission bandwidth of the RedCap terminal;
wherein the multiple measurement resource subsets comprise first-part measurement resource subsets and second-part measurement resource subsets; wherein the measurement time units comprise a first measurement time unit and a second measurement time unit;
the first-part measurement resource subsets correspond to first measurement time units and the second-part measurement resource subsets correspond to second measurement time units; there is an association relationship between the first measurement time units and the second measurement time units; wherein the measurement time units comprise measurement slots, and the first measurement time units and the second measurement time units are different measurement slots determined based on a common measurement period and a common slot offset; and
measuring, within the measurement time units corresponding to the multiple measurement resource subsets, a reference signal.

10. A non-transitory storage medium, storing instructions, wherein the instructions in the storage medium are executed by a processor of a Reduced capability (RedCap) terminal to cause the RedCap terminal to perform the information measurement method of claim 1.

11. A network device, comprising:
a processor;
a memory, configured to store processor executable instructions;
wherein the processor is configured to perform the information measurement method of claim 5.

12. A non-transitory storage medium, storing instructions, wherein the instructions in the storage medium are executed by a processor of a network device to cause the network device to perform the information measurement method of claim 5.

13. The information measurement method of claim 1, wherein the reference signal is a channel state information reference signal.

14. The information measurement method of claim 1, wherein the multiple measurement resource subsets comprise sub-bands or frequency bands, wherein each of the sub-bands or frequency bands is within a bandwidth range of the RedCap terminal.

15. The information measurement method of claim 14, wherein the sub-bands or frequency bands are disperse or continuous in a frequency domain.

16. The information measurement method of claim 14, wherein the sub-bands or frequency bands belong to a same frequency unit or to different frequency units.

17. The information measurement method of claim 1, further comprising:
determining a starting time based on the common measurement period and the common slot offset;
measuring the first-part measurement resource subset at the determined starting time; and
measuring the second-part measurement resource subset in a next slot after the starting time.

18. The information measurement method of claim 5, wherein the reference signal is a channel state information reference signal.

19. The information measurement method of claim 5, wherein the multiple measurement resource subsets comprise sub-bands or frequency bands, wherein each of the sub-bands or frequency bands is within a bandwidth range of the RedCap terminal.

20. The information measurement method of claim 19, wherein the sub-bands or frequency bands are disperse or continuous in a frequency domain.

* * * * *